(12) United States Patent
Sherkin et al.

(10) Patent No.: US 10,505,950 B2
(45) Date of Patent: Dec. 10, 2019

(54) SYSTEM, METHOD, AND COMPUTER PROGRAM PRODUCT FOR MULTI-LAYER ENCRYPTION OF AN EFFICIENT BROADCAST MESSAGE

(71) Applicant: Dark Matter L.L.C., Dubai (AE)

(72) Inventors: Alexander Sherkin, Vaughan (CA); Eugene Chin, Oakville (CA); Ravi Singh, Toronto (CA)

(73) Assignee: DARK MATTER L.L.C., Dubai (AE)

( * ) Notice: Subject to any disclaimer, the term of this patent is extended or adjusted under 35 U.S.C. 154(b) by 138 days.

(21) Appl. No.: 15/645,795

(22) Filed: Jul. 10, 2017

(65) Prior Publication Data

US 2019/0014126 A1 Jan. 10, 2019

(51) Int. Cl.
| | | |
|---|---|---|
| *H04L 29/00* | (2006.01) | |
| *H04L 29/06* | (2006.01) | |
| *H04L 12/18* | (2006.01) | |
| *H04L 12/40* | (2006.01) | |
| *H04L 12/403* | (2006.01) | |
| *H04L 29/08* | (2006.01) | |

(52) U.S. Cl.
CPC ........ *H04L 63/123* (2013.01); *H04L 12/1886* (2013.01); *H04L 12/40* (2013.01); *H04L 12/403* (2013.01); *H04L 63/0281* (2013.01); *H04L 63/0471* (2013.01); *H04L 63/0478* (2013.01); *H04L 63/061* (2013.01); *H04L 63/1475* (2013.01); *H04L 69/22* (2013.01); *H04L 63/166* (2013.01); *H04L 67/36* (2013.01)

(58) Field of Classification Search
CPC ..... H04L 51/18; H04L 51/38; H04L 12/1845; H04L 63/0471; H04L 63/061
See application file for complete search history.

(56) References Cited

U.S. PATENT DOCUMENTS

| | | | |
|---|---|---|---|
| 6,496,928 B1 * | 12/2002 | Deo ............... | G06F 1/3209 380/270 |
| 2003/0110397 A1 | 6/2003 | Supramaniam et al. | |
| 2003/0172114 A1 * | 9/2003 | Leung ............ | H04W 28/06 709/205 |
| 2008/0069350 A1 | 3/2008 | Reinoso et al. | |

OTHER PUBLICATIONS

International Search Report and Written Opinion from PCT Application No. PCT/CA2018/000137, dated Oct. 1, 2018.
Sherkin et al., U.S. Appl. No. 15/202,447, filed Jul. 5, 2016.
Sherkin et al., U.S. Appl. No. 15/179,903, filed Jun. 10, 2016.

* cited by examiner

*Primary Examiner* — Ghazal B Shehni
(74) *Attorney, Agent, or Firm* — Zilka-Kotab, P.C.

(57) ABSTRACT

A system, method, and computer program product are provided for multi-layer encryption of an efficient broadcast message. In use, a message is identified that includes data to be broadcasted to a plurality of recipients as well as identifiers of the plurality of recipients. The message is encrypted using a first encryption process to form a first header portion and a first data portion. Additionally, the message with the first data portion is encrypted using a second encryption process to form a second header portion and a second data portion. Further, the first header portion is encrypted using a third encryption process to form a third header portion. A multi-layer efficient broadcast message is then formed for broadcasting the data to the plurality of recipients, the multi-layer efficient broadcast message including the second header portion, the third header portion, and the second data portion.

19 Claims, 5 Drawing Sheets

SYSTEM, METHOD, AND COMPUTER PROGRAM PRODUCT FOR MULTI-LAYER ENCRYPTION OF AN EFFICIENT BROADCAST MESSAGE

FIELD OF THE INVENTION

The present invention relates to message encryption, and more particularly to encryption of efficient broadcast messages.

BACKGROUND

Conventional messaging in a network environment involves transmitting a message from one entity to another within the network environment. One well known example involves transmitting email messages across a network (e.g. the Internet) between a sending computer and a recipient computer. Oftentimes, it is desired to provide protection to these messages, which are vulnerable to interception by unintended recipients.

There are numerous well known encryption mechanisms that can be used to encrypt a message in order to provide the aforementioned protection. Generally, encryption of a message involves performing operations on the message using a specific key in order to convert that message into code. A recipient of the message, with knowledge of the key, must then decrypt the code using the key in order to regenerate the message.

In some circumstances, it is desirable to apply two layers of encryption to a message in order to provide enhanced protection of the message. To date, two layer encryption has been sequential, meaning the output of one encryption mechanism is input to another encryption mechanism. However, this technique for two layer encryption, as well as other old encryption techniques, does not work in an efficient message broadcasting scheme where a single message generated by a sender contains data to be broadcasted to a plurality of recipients as well as identifiers of those recipients. In particular, the routing server, which splits the message into individual messages each having the data but being directed towards a single one of the recipients, will not be capable of splitting the message when the recipient identifiers are encapsulated within the encrypted message.

There is thus a need for addressing these and/or other issues associated with the prior art.

SUMMARY

A system, method, and computer program product are provided for multi-layer encryption of an efficient broadcast message. In use, a message is identified that includes data to be broadcasted to a plurality of recipients as well as identifiers of the plurality of recipients. The message is encrypted using a first encryption process to form a first header portion and a first data portion. Additionally, the message with the first data portion is encrypted using a second encryption process to form a second header portion and a second data portion. Further, the first header portion is encrypted using a third encryption process to form a third header portion. A multi-layer efficient broadcast message is then formed for broadcasting the data to the plurality of recipients, the multi-layer efficient broadcast message including the second header portion, the third header portion, and the second data portion.

DETAILED DESCRIPTION

Figure 1:
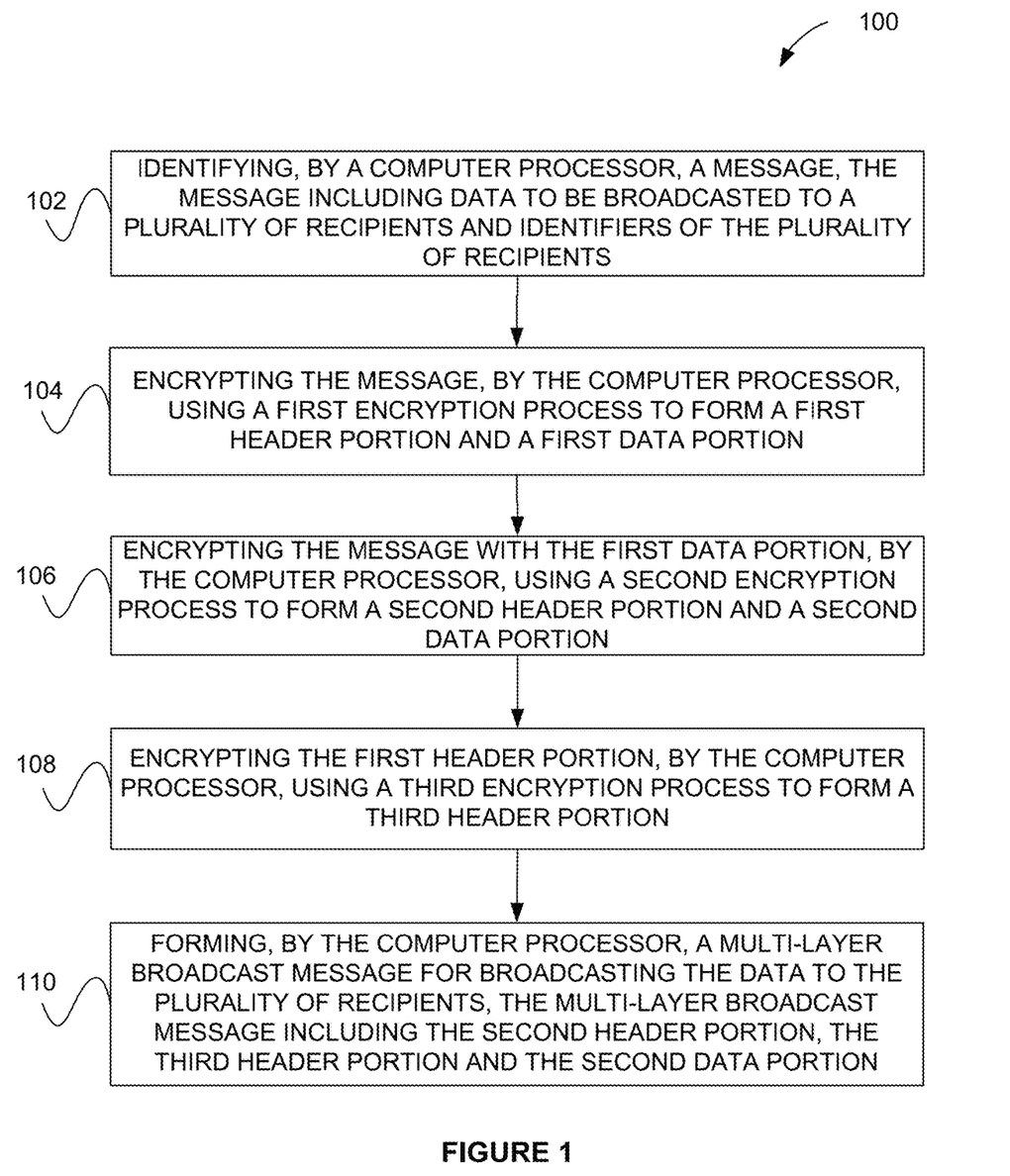
FIG. 1 shows a method for multi-layer encryption of an efficient broadcast message, in accordance with one embodiment.

FIG. 1 shows a method 100 for multi-layer encryption of an efficient broadcast message, in accordance with one embodiment. The method 100 may be performed by one or more computer processors. The computer processor may be any type of hardware processor located in any computer system capable of performing the method 100 described herein. Various examples of this computer processor and computer system are described below with reference to FIGS. 5 and 6. Just by way of example, the computer processor may be located in a computer system of a sender (i.e. originator) of the efficient broadcast message. As another example, the computer processor may be located in a server computer in communication with the sender via a network, where the server computer receives the message from the sender for encryption purposes.

As shown in operation 202, a message is identified that includes data to be broadcasted to a plurality of recipients as well as identifiers of the plurality of recipients. In the context of the present description, the message includes any type of message having both data to be broadcasted to a plurality of recipients as well as identifiers of the plurality of recipients. Thus, the message may be an efficient broadcast message, where the message is a single message that includes identifiers of all of the intended recipients (e.g. as headers in the message) as well as the data (e.g. content) to be broadcasted to those recipients (e.g. as a body in the message).

In some embodiments, the message may be an email message, a text message, etc. Accordingly, the message may be generated and initiated by a user utilizing a user interface. Of course, the message may also be automatically generated and initiated by a computer process or computer application. To this end, the message may be identified in response to the generation of the message or the initiation of (e.g. request to send) the message, or in response to receipt of the message for encryption thereof.

As shown in operation 104, the message is encrypted using a first encryption process to form (i.e. output) a first header portion and a first data portion. The first header portion may include a plurality of per-recipient headers, which may be separate headers for each recipient of the plurality of recipients. Each per-recipient header may have an identifier of the recipient as well as a first encryption key associated with the first encryption process. The first data portion may be the encrypted version of the data resulting from the first encryption process being applied to the data in the message identified in operation 202.

Table 1 illustrates one exemplary format for the message after being encrypted in operation 104. In the example shown, HR1 to HRN are per-recipient headers in the first header portion that are each specific to a different one of the intended recipients for the message, and C is the encrypted data in the first data portion. Of course, the format shown is just by way of example and should not be construed as limiting in any manner.

TABLE 1

{HR1 | HR2 | HR3 | ... | HRN | C}

One exemplary method and system for encrypting an efficient broadcast message, such as in operation 104, is disclosed in U.S. patent application Ser. No. 15/202,447, by Sherkin et al., filed Jul. 5, 2016 and entitled "APPARATUS, COMPUTER PROGRAM, AND METHOD FOR SECURELY BROADCASTING MESSAGES," which is hereby incorporated by reference in its entirety.

Additionally, as shown in operation 106, the message with the first data portion is encrypted using a second encryption process to form a second header portion and a second data portion. For example, the output of the first encryption process may be input to the second encryption process for further (i.e. a second layer) encryption thereof. The second header portion may also include a plurality of per-recipient headers, which, as described above, may be separate headers for each recipient of the plurality of recipients. However, following operation 106, each per-recipient header may have an identifier of the recipient as well as a second encryption key associated with the second encryption process. The second data portion may be another encrypted version of the data (i.e. a two-layer encrypted version of the data) resulting from the second encryption process being applied to the encrypted data in the first data portion formed in operation 104.

Table 2 illustrates one example of the format of the message after being encrypted in operation 106. In the example shown, HR1' to HRN' are headers in the message each identifying a different one of the intended recipients for the message, and C' is the two-layer encrypted data to be broadcasted to each of those intended recipients. Of course, the format shown is just by way of example and should not be construed as limiting in any manner.

TABLE 2

{HR1' | HR2' | HR3' | ... | HRN' | C'}

Operation 106 may also similarly be performed in the context of the method and system for encrypting an efficient broadcast message, as disclosed in U.S. patent application Ser. No. 15/202,447, by Sherkin et al., filed Jul. 5, 2016 and entitled "APPARATUS, COMPUTER PROGRAM, AND METHOD FOR SECURELY BROADCASTING MESSAGES," which is hereby incorporated by reference in its entirety.

As described above, two encryption processes, including the first encryption process and the second encryption process, are performed on the message data in sequence to generate two-layer encrypted message data. However, separate sets of per-recipient headers are created from each one of the encryption processes. These separate sets of per-recipient headers are processed as described below in operation 108 to generate a single two-layer encrypted efficient broadcast message.

In the present description, the first encryption process and the second encryption process are different encryption processes. In one embodiment, the different encryption processes may be different implementations of a same set of cryptographic primitives (i.e. algorithms, operations, functions, etc.). Just by way of example, the first encryption process may be a post-quantum cryptographic process that protects against quantum computer attacks, and the second encryption process may be a conventional cryptographic process that is vulnerable to the quantum computer attacks.

Further, as shown in operation 108, the first header portion is encrypted using a third encryption process to form a third header portion. The third encryption process may be the same as the second encryption process used to encrypt the message data the second time. Operation 108 may include encrypting the first encryption key included with each identifier of the plurality of recipients using a predefined header encryption key. The result of operation 108 may be the third header portion that is a set of per-recipient headers, where each per-recipient header has an encrypted version of the first encryption key for the corresponding recipient.

Moreover, in operation 110, a multi-layer efficient broadcast message is formed for broadcasting the data to the plurality of recipients, where the multi-layer efficient broadcast message includes the second header portion, the third header portion, and the second data portion. In one embodiment, the third header portion may be included in the second header portion of the message resulting from operation 106. For example, the per-recipient headers in the third header portion inserted with the corresponding per-recipient headers in the second header portion.

Table 3 illustrates one example of the format of the multi-layer efficient broadcast message formed in operation 110. In the example shown, EHR1 to EHRN are the per-recipient headers in the third header portion. Of course, the format shown is just by way of example and should not be construed as limiting in any manner.

TABLE 3

{EHR1 | HR1' | EHR2 | HR2' | EHR3 | HR3' | ... | EHRN | HRN' | C'}

Thus, the method 100 described above forms a multi-layer efficient broadcast message. The multi-layer efficient broadcast message may be capable of being processed by a routing server to broadcast to each of the recipients the second data portion (i.e. the two-layer encrypted data) with the corresponding per-recipient headers. Exemplary operations of the routing server to perform this broadcasting are described in more detail below with reference to FIG. 3.

Further, since the recipients receive from the routing server the second data portion, the data from the original message identified in operation 102 may only be accessible to the plurality of recipients upon decryption thereof by performing two layers of decryption to the second data portion. The each step in the two-step decryption process may be performed in a manner as described in the above mentioned U.S. patent application Ser. No. 15/202,447, by Sherkin et al., filed Jul. 5, 2016 and entitled "APPARATUS, COMPUTER PROGRAM, AND METHOD FOR SECURELY BROADCASTING MESSAGES," which is hereby incorporated by reference in its entirety.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Figure 2:
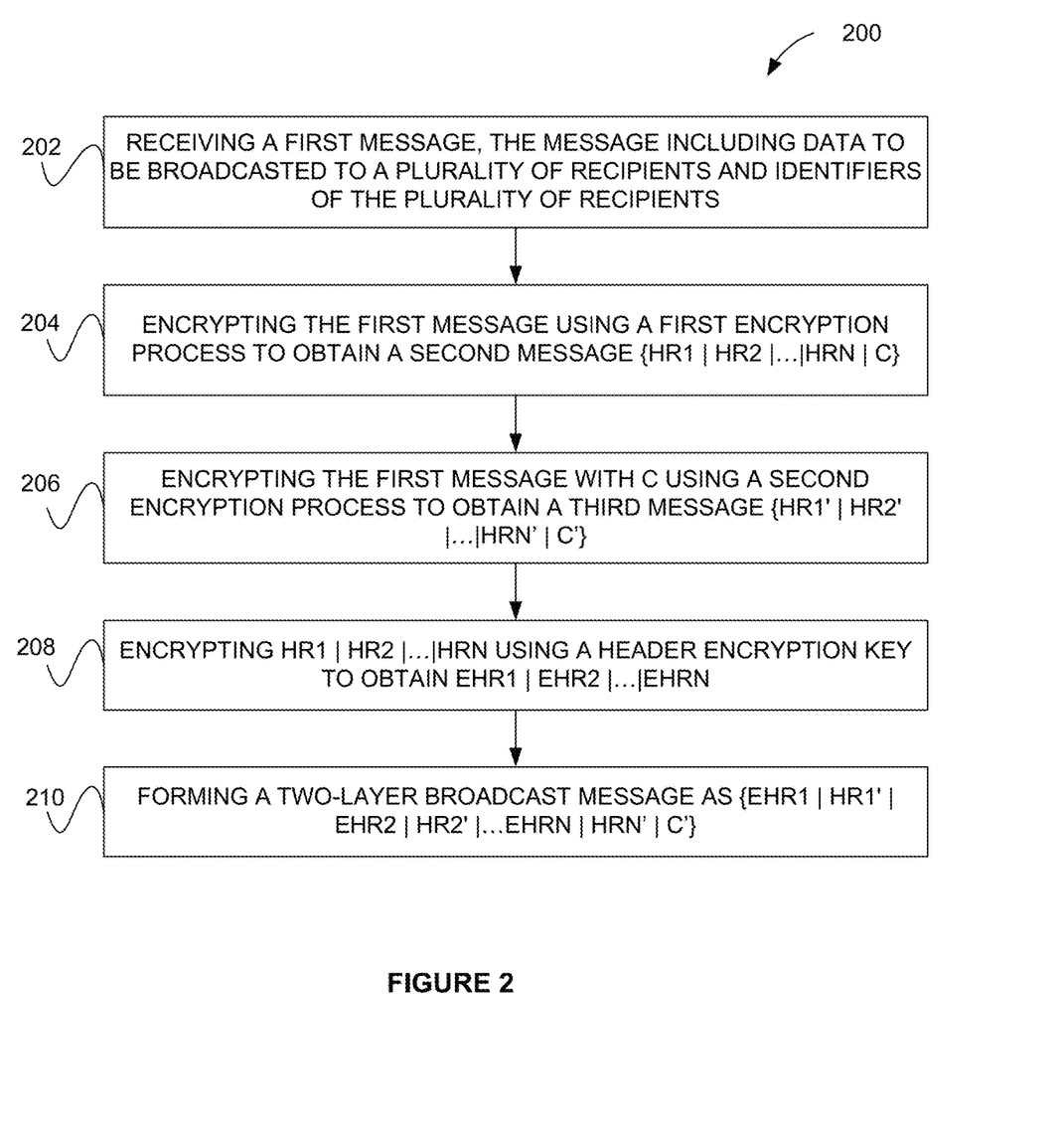
FIG. 2 shows a method for two-layer encryption of an efficient broadcast message, in accordance with another embodiment.

FIG. 2 shows a method 200 for two-layer encryption of an efficient broadcast message, in accordance with another embodiment. As an option, the method 200 may be carried out in the context of the method 100 of FIG. 1 (e.g. by the computer processor mentioned with respect to FIG. 1). Of course, however, the method 200 may be carried out in any desired context. It should also be noted that the aforementioned definitions may apply during the present description.

As shown in operation 202, a first message is received, where the message includes data to be broadcasted to a plurality of recipients as well as identifiers of the plurality of recipients. For example, the message may be received from a computer application through which the message was generated. Then, in operation 204, the first message is encrypted using a first encryption process to obtain a second message in the form of {HR1|HR2|HR3| . . . |HRN|C}, where HR1 to HRN are per-recipient headers having first encryption keys associated with the first encryption process and C is an encrypted version of the data resulting from the first encryption process being applied to the data in the first message.

Additionally, in operation 206, the first message is encrypted with C (as opposed to the original data) using a second encryption process to obtain a third message in the form of {HR1'|HR2'|HR3'| . . . |HRN'|C'}, where HR1' to HRN' are per-recipient headers having second encryption keys associated with the second encryption process and C' is an encrypted version of C resulting from the second encryption process being applied to the encrypted data in the second message (i.e. such that C' has two layers of encryption).

Further, in operation 208, HR1 to HRN are encrypted using a header encryption key to obtain EHR1 to EHRN. This allows the first encryption key in each per-recipient header in the second message to be protected. In operation 210, a two-layer broadcast message is formed as {EHR1|HR1'|EHR2|HR2'|EHR3|HR3'| . . . |EHRN|HRN'|C'}, for example by adding EHR1 to EHRN to the third message.

Figure 3:
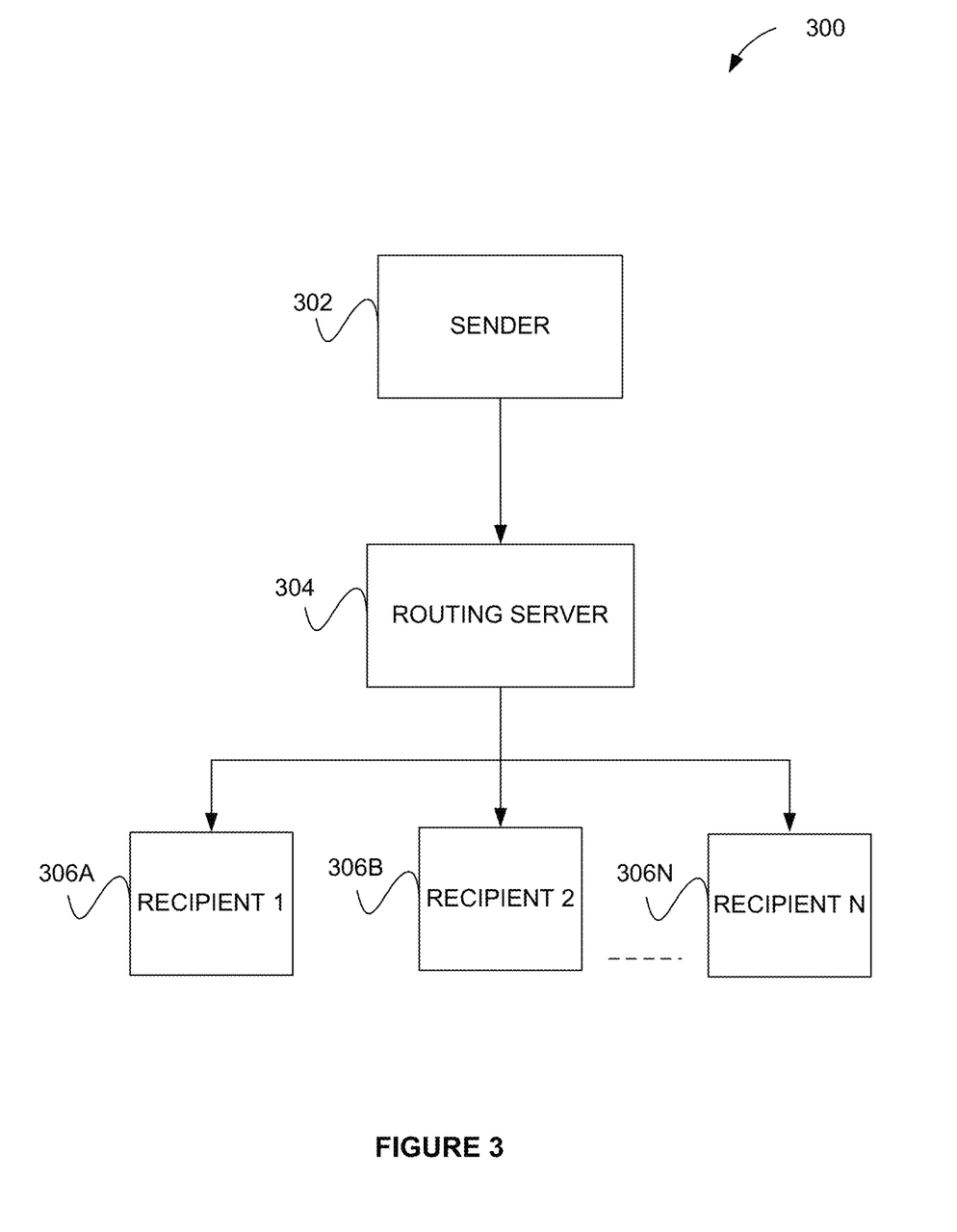
FIG. 3 shows a system for broadcasting a two-layer encrypted efficient broadcast message, in accordance with yet another embodiment.

FIG. 3 shows a system 300 for broadcasting a two-layer encrypted efficient broadcast message, in accordance with yet another embodiment. As an option, the present system 300 may be implemented to carry out the methods of FIGS. 1 and/or 2. For example, the sender 302 may carry out the methods of FIGS. 1 and/or 2. Of course, however, the system 300 may be implemented in any desired context. In one embodiment, the system 300 may be implemented across one or more communication networks. Again, it should also be noted that the aforementioned definitions may apply during the present description.

As shown, a sender (i.e. a computer system of a sender) 302 is in communication with a plurality of recipients (i.e. computer systems of the recipients) 306A-N through a routing server 304. This particular configuration shown may be implemented for message broadcasting purposes. For other types of communication, the sender 302 may optionally be in communication with the recipients 306A-N without use of the routing server 304.

When the sender 302 forms a multi-layer encryption efficient broadcast message, the sender 302 forwards the message to the routing server 304. The routing server 304 is operable, upon receipt of the message, to broadcast the message to the recipients 306A-N. This generally requires processing of the message by the routing server 304.

In one embodiment, the processing performed by the routing server 304 may include identifying, from the message, the identifiers of the plurality of recipients 306A-N. The processing may further include generating, for each recipient of the plurality of recipients 306A-N, an individual message that is destined for the recipient. The individual message for each recipient may be generated to include the two-layer encrypted data from the message as well as the per-recipient headers in the message that correspond to the recipient. Then, the routing server 304 may send each individual message to the corresponding recipient to which the individual message is destined.

Table 4 illustrates one example of the format of the individual messages generated by the routing server from the message of Table 3. EHR1 to EHRN and HR1' to HRN' are headers in each individual message. Of course, the format shown is just by way of example and should not be construed as limiting in any manner.

TABLE 3

| {EHR1 \| HR1' \| C'} |
|---|
| {EHR2 \| HR2' \| C'} |
| {EHR3 \| HR3' \| C'} |
| . . . |
| {EHRN \| HRN' \| C'} |

While the broadcasting of the message is described above as being performed by a routing server 304, it should be noted that operation 106 may be performed in other contexts. For example, the message may be forwarded to any other computer system capable of broadcasting the message to the recipients in the manner described above.

Upon receipt of an individual message by each of the recipients 306A-N, the recipient 306A-N must decrypt the two-layer encrypted data C' included in the individual message in order to access the data. Each of the recipients 306A-N may be equipped to decrypt the headers included in the individual message, in order to access the keys therein. Those keys may then be used by the recipient 306A-N to apply two-layer decryption to C'.

In an alternative embodiment to that shown in FIG. 3, the sender 302 may directly send the multi-layer encryption efficient broadcast message having the entire set of per-recipient headers to each of the recipients 306A-N. Each recipient 306A-N may only be equipped to decrypt the per-recipient headers specific to that recipient 306A-N, in order to access the keys therein and use the same to apply two-layer decryption to C'.

Figure 4:
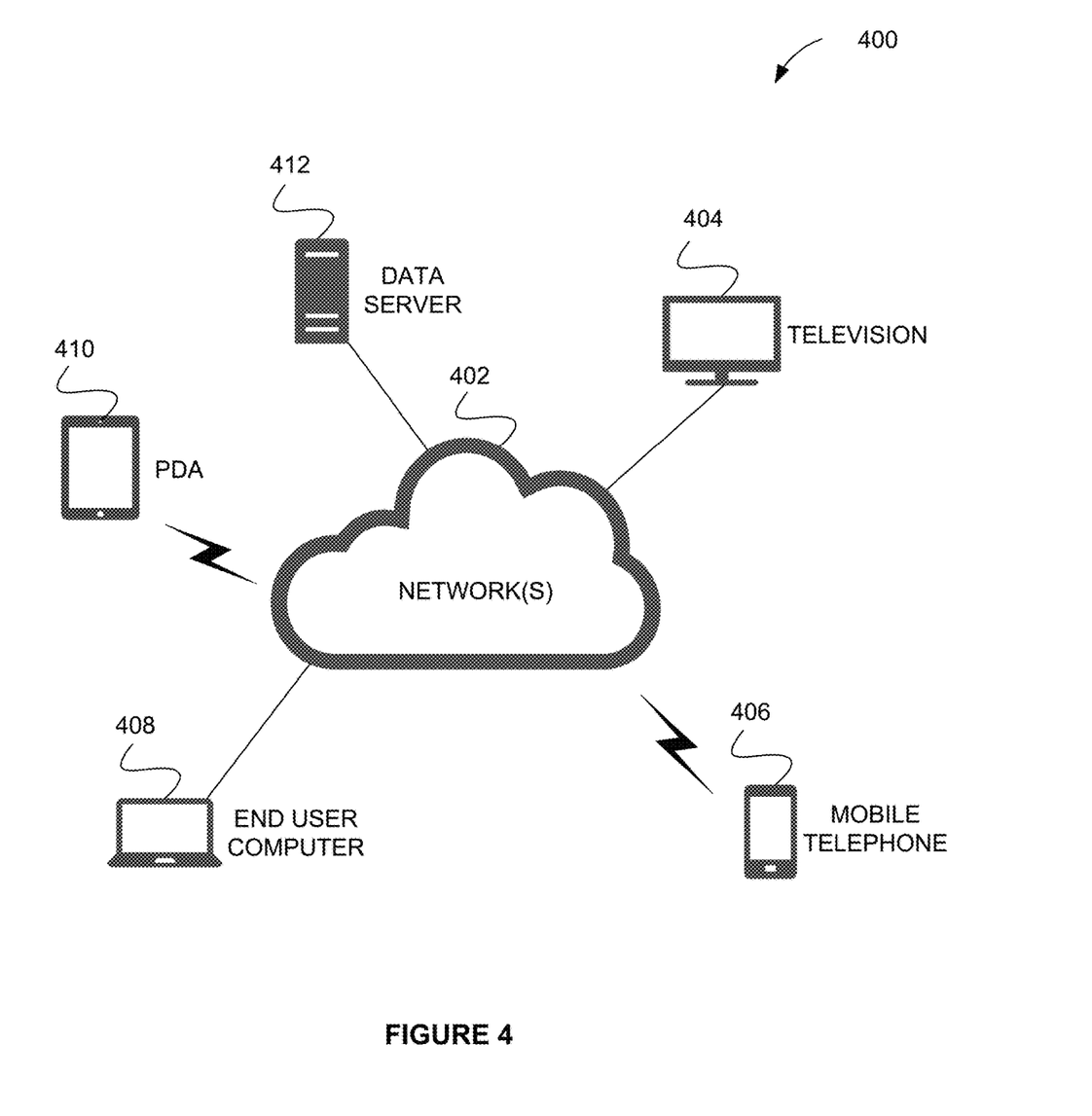
FIG. 4 illustrates a network architecture, in accordance with one embodiment.

FIG. 4 illustrates a network architecture 400, in accordance with one embodiment. As shown, at least one network 402 is provided. In various embodiments, any one or more components/features set forth during the description of any previous figure(s) may be implemented in connection with any one or more of the components of the at least one network 402.

In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 412 and an end user computer 408 may be coupled to the network 402 for communication purposes. Such end user computer 408 may include a desktop computer, lap-top computer, and/or any other type of logic. Still yet, various other devices may be coupled to the network 402 including a personal digital assistant (PDA) device 410, a mobile phone device 406, a television 404, etc.

Figure 5:
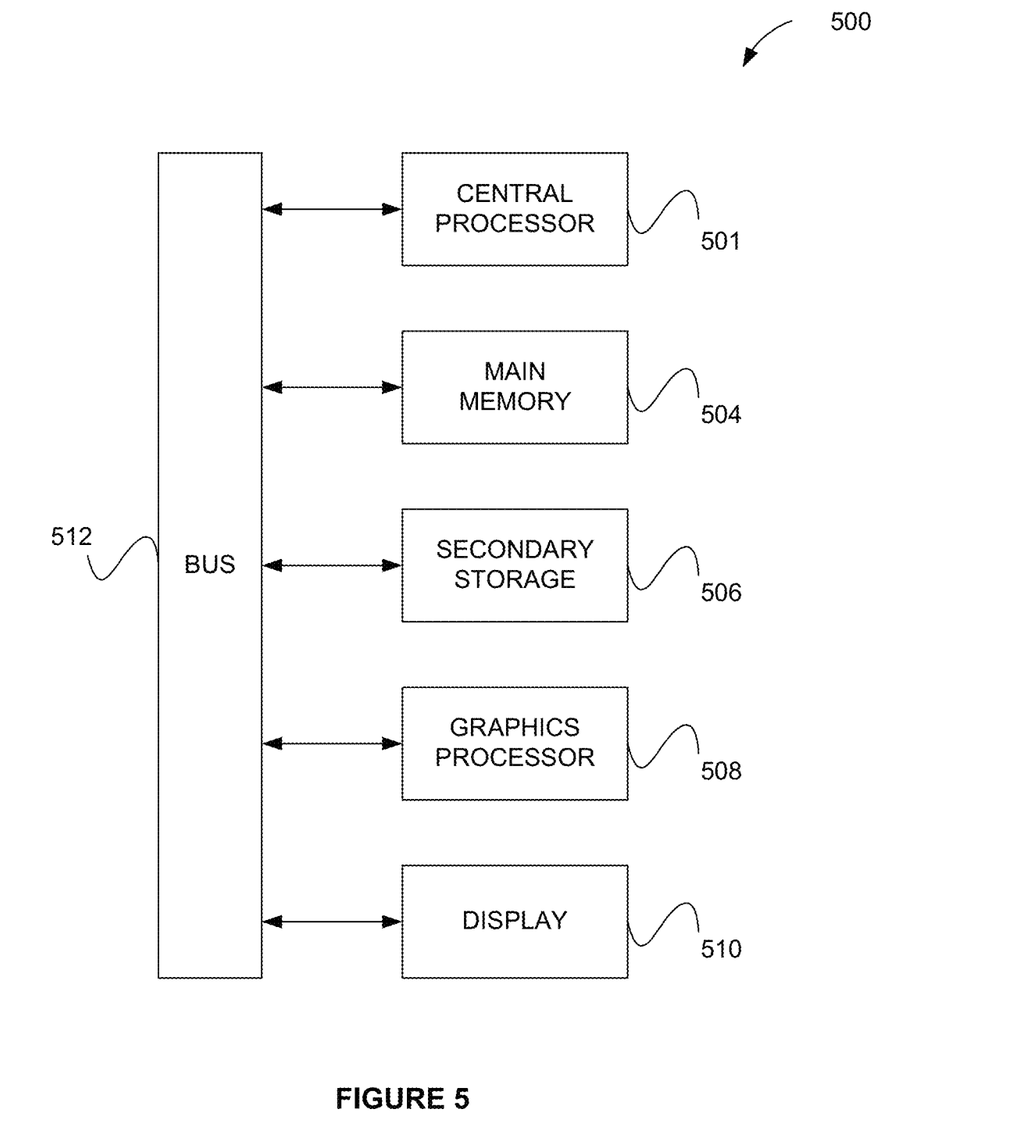
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. However, it is to be appreciated that the system 500 may be implemented in any desired environment.

As shown, a system 500 is provided including at least one central processor 502 which is connected to a bus 512. The system 500 also includes main memory 504 [e.g., hard disk drive, solid state drive, random access memory (RAM), etc.]. The system 500 also includes a graphics processor 508 and a display 510.

The system 500 may also include a secondary storage 506. The secondary storage 506 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 506, and/or any other memory, for that matter. Such computer programs, when executed, enable the system 500 to perform various functions (as set forth above, for example). Memory 504, secondary storage 506 and/or any other storage are possible examples of non-transitory computer-readable media.

In one embodiment, means in the form of the processor 502 (and/or different means corresponding to different components thereof) executes instructions in the memory 504 or in the secondary storage 506 to: identify a message, by a computer processor, the message including data to be broadcasted to a plurality of recipients as well as identifiers of the plurality of recipients; encrypt the message, by the computer processor, using a first encryption process to form a first header portion and a first data portion; encrypt the message with the first data portion, by the computer processor, using a second encryption process to form a second header portion and a second data portion; encrypt the first header portion, by the computer processor, using a third encryption process to form a third header portion; and form, by the computer processor, a multi-layer efficient broadcast message for broadcasting the data to the plurality of recipients, the multi-layer efficient broadcast message including the second header portion, the third header portion, and the second data portion.

Optionally, in any of the preceding embodiments, the instructions are executed in a computer system of a sender of the message. Optionally, the sender is the originator of the message.

Optionally, in any of the preceding embodiments, the message is identified in response to generation of the message. Optionally, the message is generated by a user utilizing a user interface. As another option, the message is generated automatically by a computer application.

Optionally, in any of the preceding embodiments, the identifiers of the plurality of recipients are included as headers in the message, and the data to be broadcasted to the plurality of recipients is included as a body in the message.

Optionally, in any of the preceding embodiments, the first encryption process and the second encryption process are different encryption processes. Optionally, the different encryption processes are different implementations of a same set of cryptographic algorithms. As another option, the first encryption process is a post-quantum cryptographic process that protects against quantum computer attacks, and the second encryption process that is a conventional cryptographic process that is vulnerable to the quantum computer attacks.

Optionally, in any of the preceding embodiments, the first header portion includes with each identifier of the plurality of recipients a first encryption key associated with the first encryption process. Optionally, encrypting the first header portion, by the computer processor, using a third encryption process to form a third header portion includes: encrypting the first encryption key included with each identifier of the plurality of recipients Optionally, in any of the preceding embodiments, the second header portion includes with each identifier of the plurality of recipients a second encryption key associated with the second encryption process.

Optionally, in any of the preceding embodiments, the multi-layer efficient broadcast message is forwarded to a routing server. Optionally, the routing server is operable, upon receipt of the multi-layer efficient broadcast message, to broadcast the multi-layer efficient broadcast message to the plurality of recipients. As a further option, the routing server is operable, upon receipt of the message, to broadcast the multi-layer efficient broadcast message to the plurality of recipients by: identifying, from the multi-layer efficient broadcast message, the identifiers of the plurality of recipients; generating, for each recipient of the plurality of recipients, an individual message that is destined for the recipient, the individual message having the second data portion and headers specific to the recipient from the second header portion and the third header portion; and for each generated individual message, sending the individual message to the recipient to which the individual message is destined.

Optionally, in any of the preceding embodiments, the data is only accessible to the plurality of recipients upon decryption of the second data portion within the multi-layer efficient broadcast message.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    identifying a message, by a computer processor, the message including data to be broadcasted to a plurality of recipients as well as identifiers of the plurality of recipients;
    encrypting the message, by the computer processor, using a first encryption process to form a first header portion and a first data portion;
    encrypting the message with the first data portion, by the computer processor, using a second encryption process to form a second header portion and a second data portion;
    encrypting the first header portion, by the computer processor, using a third encryption process to form a third header portion; and
    forming, by the computer processor, a multi-layer efficient broadcast message for broadcasting the data to the plurality of recipients, the multi-layer efficient broadcast message including the second header portion, the third header portion, and the second data portion;
    wherein the first encryption process and the second encryption process are different encryption processes.

2. The method of claim 1, wherein the computer processor is located in a computer system of a sender of the message.

3. The method of claim 2, wherein the sender is the originator of the message.

4. The method of claim 1, wherein the message is identified in response to generation of the message.

5. The method of claim 4, wherein the message is generated by a user utilizing a user interface.

6. The method of claim 4, wherein the message is generated automatically by a computer application.

7. The method of claim 1, wherein the identifiers of the plurality of recipients are included as headers in the message, and wherein the data to be broadcasted to the plurality of recipients is included as a body in the message.

8. The method of claim 1, wherein the different encryption processes are different implementations of a same set of cryptographic algorithms.

9. The method of claim 1, wherein the first encryption process is a post-quantum cryptographic process that protects against quantum computer attacks, and the second encryption process that is a conventional cryptographic process that is vulnerable to the quantum computer attacks.

10. The method of claim 1, wherein the first header portion includes with each identifier of the plurality of recipients a first encryption key associated with the first encryption process.

11. The method of claim 10, wherein encrypting the first header portion, by the computer processor, using a third encryption process to form a third header portion includes:
encrypting the first encryption key included with each identifier of the plurality of recipients.

12. The method of claim 1, wherein the second header portion includes with each identifier of the plurality of recipients a second encryption key associated with the second encryption process.

13. The method of claim 1, wherein the multi-layer efficient broadcast message is forwarded to a routing server.

14. The method of claim 13, wherein the routing server is operable, upon receipt of the multi-layer efficient broadcast message, to broadcast the multi-layer efficient broadcast message to the plurality of recipients.

15. The method of claim 14, wherein the routing server is operable, upon receipt of the message, to broadcast the multi-layer efficient broadcast message to the plurality of recipients by:
identifying, from the multi-layer efficient broadcast message, the identifiers of the plurality of recipients,
generating, for each recipient of the plurality of recipients, an individual message that is destined for the recipient, the individual message having the second data portion and headers specific to the recipient from the second header portion and the third header portion, and
for each generated individual message, sending the individual message to the recipient to which the individual message is destined.

16. The method of claim 1, wherein the data is only accessible to the plurality of recipients upon decryption of the second data portion within the multi-layer efficient broadcast message.

17. A non-transitory computer readable medium storing computer code executable by a processor to perform a method comprising:
identifying a message, by a computer processor, the message including data to be broadcasted to a plurality of recipients as well as identifiers of the plurality of recipients;
encrypting the message, by the computer processor, using a first encryption process to form a first header portion and a first data portion;
encrypting the message with the first data portion, by the computer processor, using a second encryption process to form a second header portion and a second data portion;
encrypting the first header portion, by the computer processor, using a third encryption process to form a third header portion; and
forming, by the computer processor, a multi-layer efficient broadcast message for broadcasting the data to the plurality of recipients, the multi-layer efficient broadcast message including the second header portion, the third header portion, and the second data portion;
wherein the first encryption process and the second encryption process are different encryption processes.

18. An apparatus, comprising:
a computer processor for:
identifying a message the message including data to be broadcasted to a plurality of recipients as well as identifiers of the plurality of recipients;
encrypting the message using a first encryption process to form a first header portion and a first data portion;
encrypting the message with the first data portion using a second encryption process to form a second header portion and a second data portion;
encrypting the first header portion using a third encryption process to form a third header portion; and
forming a multi-layer efficient broadcast message for broadcasting the data to the plurality of recipients, the multi-layer efficient broadcast message including the second header portion, the third header portion, and the second data portion;
wherein the first encryption process and the second encryption process are different encryption processes.

19. The apparatus of claim 18, wherein the computer processor remains in communication with memory and a display via a bus.

* * * * *